(12) United States Patent
Sands

(10) Patent No.: US 9,332,881 B2
(45) Date of Patent: May 10, 2016

(54) FOOD MIXER

(71) Applicant: HOMELAND HOUSEWARES, LLC, Los Angeles, CA (US)

(72) Inventor: Lenny Sands, Los Angeles, CA (US)

(73) Assignee: Capbran Holdings, LLC, Los Angeles, CA (US)

( * ) Notice: Subject to any disclaimer, the term of this patent is extended or adjusted under 35 U.S.C. 154(b) by 127 days.

(21) Appl. No.: 14/242,681

(22) Filed: Apr. 1, 2014

(65) Prior Publication Data

US 2015/0201810 A1 Jul. 23, 2015

Related U.S. Application Data

(60) Provisional application No. 61/928,926, filed on Jan. 17, 2014.

(51) Int. Cl.
*A47J 43/07* (2006.01)
*A47J 43/04* (2006.01)
*B01F 7/00* (2006.01)
*B01F 7/08* (2006.01)

(52) U.S. Cl.
CPC *A47J 43/07* (2013.01); *A47J 43/04* (2013.01); *B01F 7/006* (2013.01); *B01F 7/00416* (2013.01); *B01F 7/00616* (2013.01); *B01F 7/086* (2013.01); *B01F 2215/0014* (2013.01)

(58) Field of Classification Search
CPC ... A47J 43/0711; A47J 43/0722; A47J 19/02; A47J 19/025; A47J 19/06; A47J 43/07; A47J 43/04; A47J 43/255; A47J 19/00; B02C 19/22; B02C 13/1807; B02C 18/06; B02C 18/2258; B01F 7/086; B01F 7/00616; B01F 7/00416; B01F 7/006; B01F 2215/0014

USPC ............ 241/93, 260.1, 74, 101.8, 101.9, 92, 241/199.12; 99/348, 509, 366, 100
See application file for complete search history.

(56) References Cited

U.S. PATENT DOCUMENTS

| | | | |
|---|---|---|---|
| 2,228,025 A | 12/1939 | Apfelbeck | |
| 2,960,926 A | 10/1957 | McKee | |
| 4,708,489 A * | 11/1987 | Carlson | A23G 9/282 241/199.12 |
| 4,856,718 A * | 8/1989 | Gaber | A47J 43/07 241/169.1 |
| 4,929,086 A * | 5/1990 | Geyer | B01F 13/1047 241/260.1 |
| 5,080,922 A * | 1/1992 | Hosokawa | A22C 17/0026 241/13 |
| 5,233,916 A | 8/1993 | Butler | |
| 5,537,918 A | 7/1996 | Patel | |
| 5,906,154 A * | 5/1999 | Yoon | A23N 1/00 100/117 |
| 6,050,180 A | 4/2000 | Moline | |
| 6,394,377 B1 | 5/2002 | Kim et al. | |
| 6,536,335 B1 | 3/2003 | Ashworth | |

(Continued)

*Primary Examiner* — Mark Rosenbaum
(74) *Attorney, Agent, or Firm* — Trojan Law Offices

(57) ABSTRACT

A food mixer comprises a receiving chamber that is connected to a mixing chamber. The mixing chamber contains a shredding component and a blending component that rotatably engages the mixing chamber. The blending component can be a screw bit that comprises a first set of spiral ridge that form a screw pattern and a second set of straight ridges on its cone-shaped top. The spiral ridges form channels between the ridges. On the surface of the channels near the bottom of the screw bit, a set of teeth is present. On the spiral ridges themselves, there is also another set of teeth. The width of the channels becomes increasing wider towards the bottom of the screw bit. The distance between the spiral ridges is larger at the bottom of the screw bit than the distance between the ridges at the top of the screw bit.

7 Claims, 5 Drawing Sheets

(56) References Cited

U.S. PATENT DOCUMENTS

| | | |
|---|---|---|
| 6,637,323 B2 | 10/2003 | Kim |
| 6,854,382 B2 | 2/2005 | Jan |
| 7,028,607 B2 | 4/2006 | Zweben |
| 7,080,594 B2 | 7/2006 | Lin |
| D539,315 S | 3/2007 | Zweben |
| 7,954,425 B2 | 6/2011 | Kral et al. |
| 8,091,473 B2 | 1/2012 | Kim |
| 8,187,651 B2 * | 5/2012 | Cabrales .................. A22C 5/00 426/274 |
| 8,245,962 B2 | 8/2012 | Didion |
| 8,474,374 B2 | 7/2013 | Trovinger |
| 8,550,390 B2 | 10/2013 | Machovina et al. |
| 8,826,812 B2 * | 9/2014 | Kim ....................... A47J 19/025 99/495 |
| 2001/0008258 A1 | 7/2001 | Robordosa et al. |
| 2003/0154867 A1 | 8/2003 | Kim |
| 2009/0064875 A1 | 3/2009 | Trovinger |
| 2009/0309310 A1 | 12/2009 | Wilson |
| 2010/0058940 A1 | 3/2010 | Rivera |
| 2010/0282886 A1 | 11/2010 | Pallmann |
| 2010/0288139 A1 | 11/2010 | Li et al. |
| 2011/0095115 A1 | 4/2011 | Waznys et al. |
| 2012/0048977 A1 | 3/2012 | Machovina et al. |
| 2012/0325946 A1 * | 12/2012 | Charles ................... A47J 19/06 241/79 |

* cited by examiner

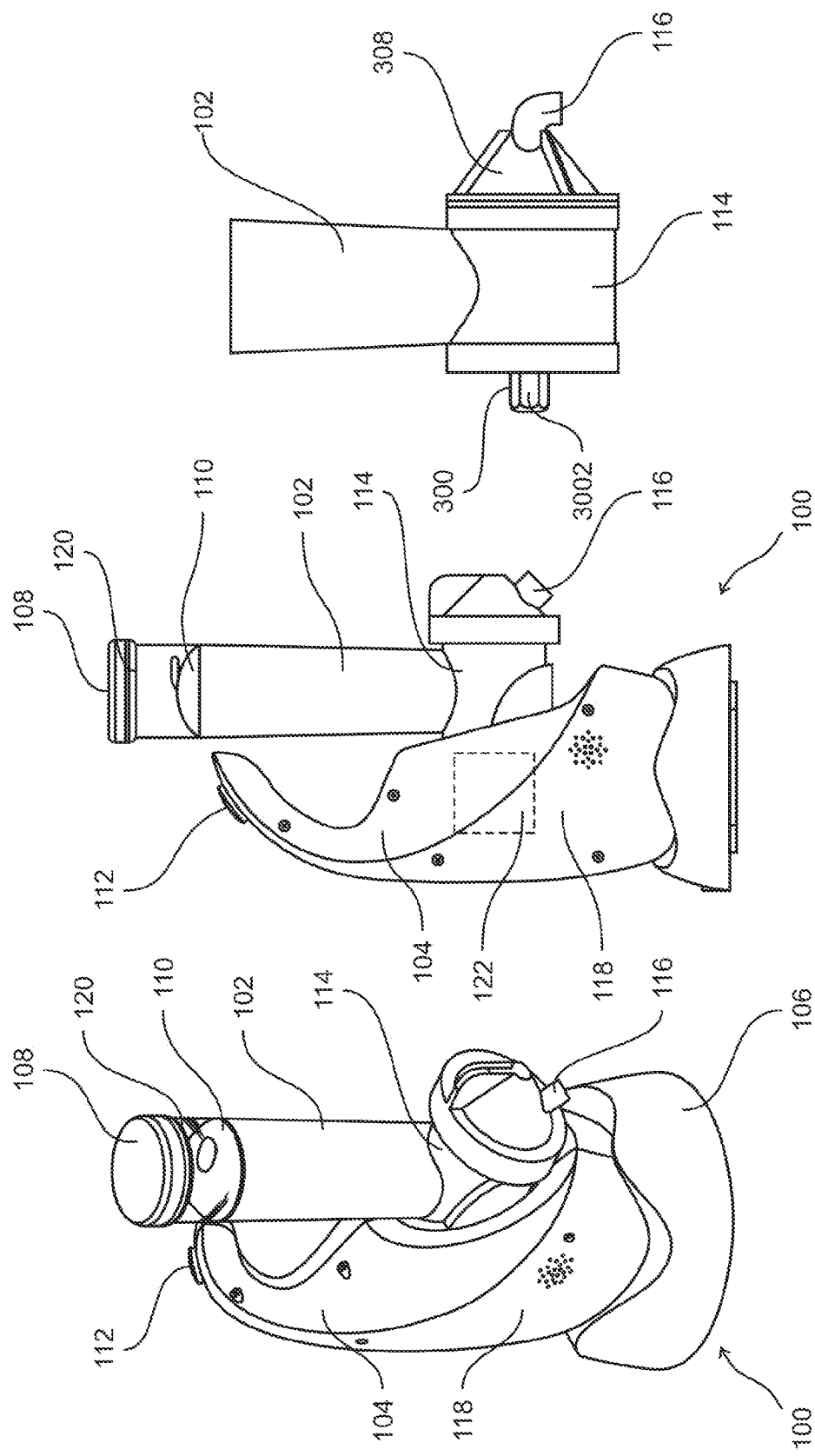

FOOD MIXER

This application claims priority to U.S. Provisional Patent Application No. 61/928,926 filed on Jan. 17, 2014.

TECHNICAL FIELD OF THE DISCLOSURE

The subject matter of the present invention relates to devices for food processing. Specifically, the subject matter of the present invention relates to food processing devices such as blenders and juice makers for mixing and blending fruit, ice cream, and juices. Even more specifically, the subject matter relates to the grinding, blending and mixing components, such as screw bits, of food-processing devices that have special shape and teeth between the screw threads and on the ridges of the screw threads.

BACKGROUND

A food mixer can be a dessert maker that blends fruits, ice cream, yogurt, and other dairy products to make smoothies and drinks. Since dairy products are used, the dessert maker must be cleaned thoroughly after use to prevent any remaining dairy products from being spoiling. For this reason, a dessert maker that can be cleaned easily is often desired.

The quality of a food mixer greatly depends on the how well the food is crushed and blended and the degree to which the final product has a consistently smooth texture. Hence, it is often important for a designer to consider the food mixer's ability to crush and blend food well and the ease with which the device can be cleaned. However, this often puts the designer into a dilemma because a food mixer with better crushing, blending and smoothing capability usually has more complicated components and is harder to be disassembled. This makes the food mixer more difficult to be cleaned.

SUMMARY

The embodiments of the present invention are directed to novel food mixers and blenders that are easy to clean, yet deliver a highly smooth quality of food. In one aspect of the invention in accordance with some of the embodiments, the food mixer comprises a receiving chamber that is connected to a mixing chamber. The mixing chamber contains a shredding component and a blending component that rotatably engage with the mixing chamber. The food mixer operates by receiving food from an inlet of the receiving chamber. The food is then pushed down into the lower part of the receiving chamber to the mixing chamber. When the food mixer is turned on, the motor drives the shredding and blending components to rotate rapidly. When the food enters the mixing chamber, it is shredded, blended and mixed by the shredding and blending components. The components will then slowly expel the food at an exit spout.

In another aspect of the invention in accordance with some of the embodiments, the blending component can be a screw bit that comprises a first set of spiral ridges that form a screw pattern and a second set of ridges, usually straight, on the screw bit's cone-shaped top. The spiral ridges form channels between the spiral ridges. On the surface of the channels near the bottom of the screw bit, a plurality of teeth are present. On the spiral ridges themselves, there also presents a plurality of teeth. The width of the channels becomes increasing wider towards the bottom of the screw bit. The distance between the ridges is larger at the bottom of the screw bit than the distance between the ridges at the top of the screw bit.

BRIEF DESCRIPTION OF THE DRAWINGS

FIG. 1 is a perspective view of a food mixer in accordance with an embodiment of the present invention.

FIG. 2 is a side view of the food mixer shown in FIG. 1 in accordance with an embodiment of the present invention.

FIG. 3 is an isolated side view of a food-processing unit of a food mixer in accordance with an embodiment of the present invention.

DETAILED DESCRIPTION OF EMBODIMENTS

Figure 4:
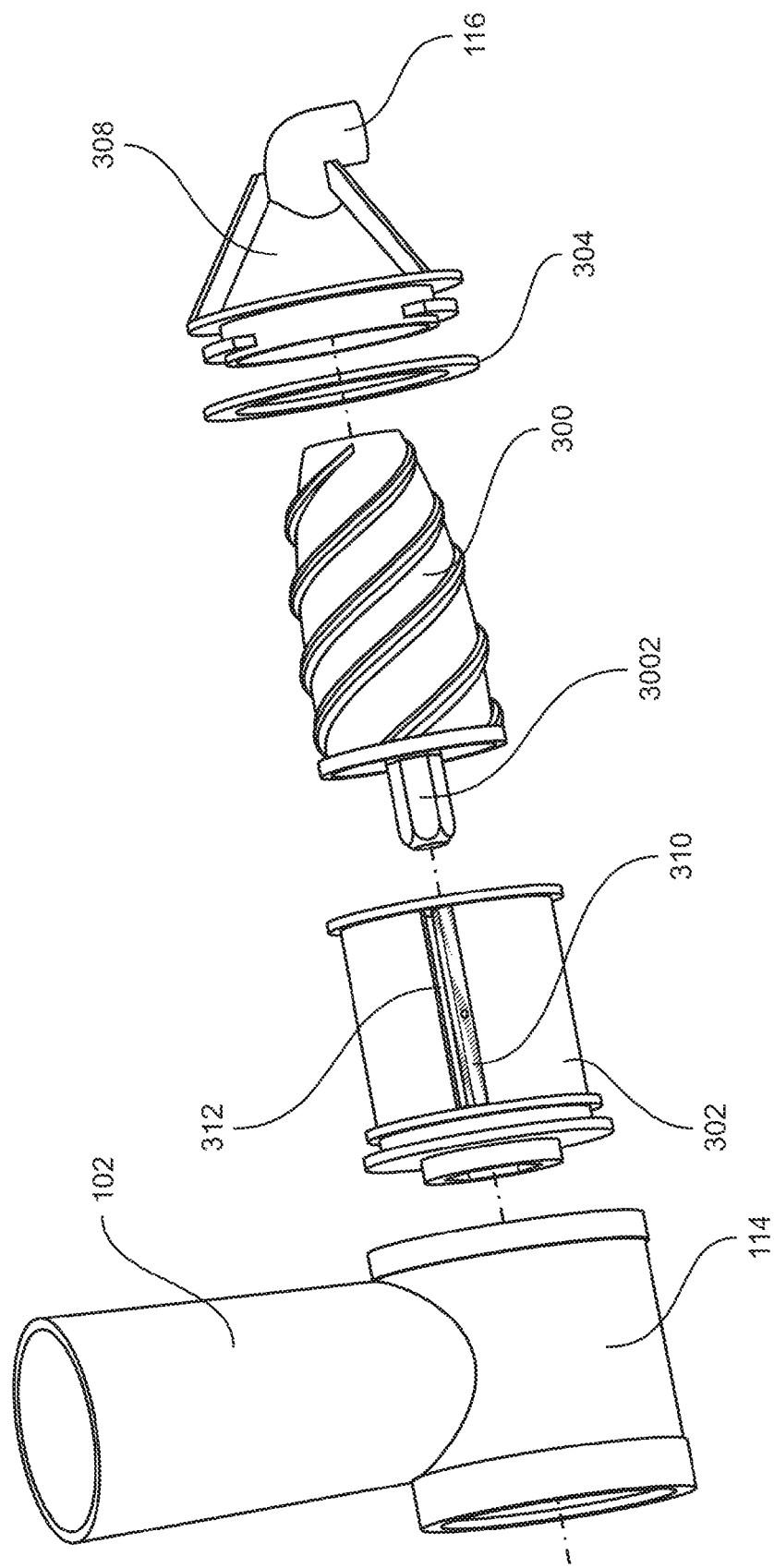
FIG. 4 is an exploded perspective view of the food-processing unit shown in FIG. 3 in accordance with an embodiment of the present invention.

In the following discussion addresses a number of embodiments and applications of the present disclosure, reference is made to the accompanying drawings that form a part hereof, and are shown by way of illustration of specific embodiments in which the disclosure may be practiced. It is to be understood that other embodiments may be utilized and changes may be made without departing from the scope of the present disclosure.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below. Finally, many of the steps are presented below in an order intended only as an exemplary embodiment. Unless logically required, no step should be assumed to be required earlier in the process than a later step simply because it is written first in this document.

FIG. 1 is a perspective view of a food mixer 100 in accordance with some embodiments of the present invention. FIG. 2 is the side view of the food mixer 100 shown in FIG. 1. The food mixer 100 comprises a lid 108 at the top of a receiving chamber 102, a mixing chamber 114, a handle 104, a motor housing 118 and a base 106. All major parts are removably coupled with other parts. The food mixer 100 can be disassembled for cleaning.

The receiving chamber 102 is where food initially enters the food mixer 100. It is a vertical cylinder with an inlet 120 at the top. The inlet 120 is covered by the lid 108. There is a plunger 110 inside the receiving chamber 102. The plunger 110 removably engages the receiving chamber 102 in the same manner that a piston engages a cylinder. The bottom of the receiving chamber 102 is connected to the mixing chamber 114. A combination of shredding, crushing and blending components reside within the mixing chamber 114. The shredding, crushing and blending components will be discussed in a greater detail below. The mixing chamber 114 has an exit spout 116 at one end and it is connected to the motor housing on the other end. The motor housing 118 contains the driving motor 122, which is illustrated by the broken-lined square shown in FIG. 2. The driving motor is connected to the shredding, crushing and blending components inside the mixing chamber 114. The motor housing 118 and the handle 104 are part of the same body of the food mixer 100. The base 106 supports the motor housing 118. On the handle 104 near the top, there is a button 112 or a plurality of buttons 102 for the users to control the food mixer 100. The button 112 is electrically connected to the motor and a power source.

The food mixer 100 operates by receiving food from the inlet 102. Before the food is blended, the food from a recipe is assembled in the receiving chamber 102. The food is then pushed down by the plunger 110 into the lower part of the receiving chamber 102 to the mixing chamber 114. When the food mixer 100 is turned on by the button 112, the motor 122 drives the shredding, crushing and blending components to rotate. When the food enters the mixing chamber 114, it is shredded, crushed, and blended. The ingredients will then be expelled at the exit spout 116 in a manner that will be discussed in a greater detail below.

Figure 6:
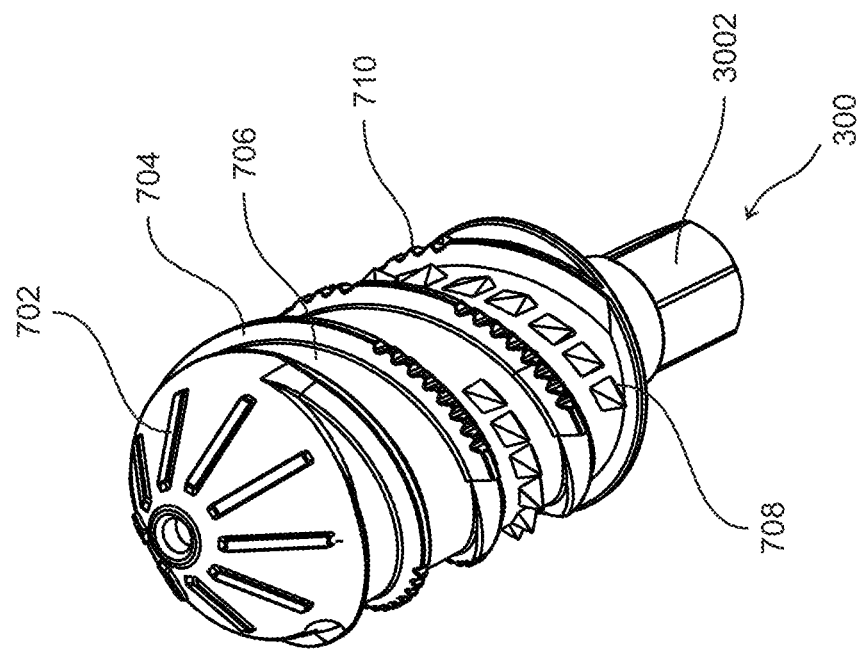
FIG. 6 is a perspective view of a screw bit of a food mixer in accordance with an embodiment of the present invention.
Figure 5:
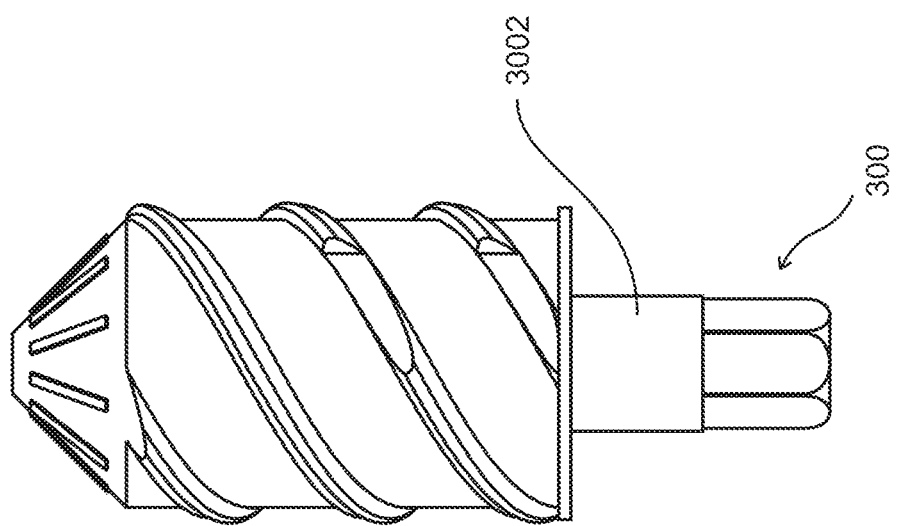
FIG. 5 is a side view of a screw bit of a food mixer in accordance with an embodiment of the present invention.

FIG. 3 is an isolated view of a food-processing unit in accordance with some embodiments of the present invention. FIG. 3 shows the receiving chamber 102, which is the top vertical cylinder, and the mixing chamber 114, which is a horizontal cylinder. Combined together and viewed from the side, the receiving chamber 102 and the mixing chamber 114 form an inverted T-shape space for the food to be placed and mixed. One side of the mixing chamber 114 is a cone-shaped cover 308, where the exit spout 116 is located at the tip of the cone-shaped cover 308. The other side of the mixing chamber 114 is connected to the motor housing 118 as shown in FIG. 1. The mixing chamber 114 has a screw bit 300 that lies horizontally and engages rotatably therein. Different embodiments of the screw bit 300 are shown in FIG. 5 and FIG. 6. The cone-shaped top of the screw bit 300 is located at the right side of the mixing chamber 114 inside the cone-shaped cover 308. The bottom of the screw bit 300 has a shaft 3002. When the entire food mixer 100 is assembled, the shaft 3002 is located in the motor housing 118 and is inserted into the motor at a well that is complementary to the shape of the shaft 3002. The motor drives the shaft 3002 and in turn rotates the screw bit 300.

FIG. 4 is an exploded perspective view of the food-processing unit shown in FIG. 3 in accordance with an embodiment of the present invention. FIG. 4 shows the detailed structure of the shredding, crushing and blending components within the mixing chamber 114. The mixing chamber 114 removably engages with the cone-shaped cover 308. An O-ring 304 is located between the mixing chamber 114 and the cone-shaped cover 308 to seal their connection surface. A blade cylinder 302 is mounted removably and rotatably inside the mixing chamber 114. The blade cylinder 302 can be connected to the motor in the motor housing 118. It has a blade 310 or a plurality of blades mounted on the surface of the cylinder and an elongated opening 312 along at least a portion of the length of each blade 310. Inside the cavity of the blade cylinder 302, the screw bit 300 rotatably engages the blade cylinder 302.

The screw bit 300 can be mounted in the blade cylinder 302 or mounted directly to the motor in the motor housing 118. When it is mounted directly to the motor, it may or may not be directly supported by the blade cylinder 302 although it is located inside the blade cylinder 302. By this arrangement, the blade cylinder 302 and the screw bit 300 may rotate at different rotational speeds. As such, when the food mixer 100 is operating, the blade cylinder 302 rotates separately relative to the mixing chamber 114 while the screw bit 300 also rotates separately relative to the blade cylinder 302. In other embodiments, the screw bit 300 is removably mounted on the blade cylinder 302 so that the screw bit 300 and the blade cylinder 302 can rotate at a synchronized speed. For example, in the particular embodiment shown in FIG. 4, the shaft 3002 has a non-circular cross section, such as a hexagonal cross section. The shaft 3002 is mounted to motor 122 through an opening at the left side of the blade cylinder 302. The opening of the blade cylinder 302 is complementary in shape with the shaft 3002. Hence, in the particular embodiment shown in FIG. 4, the opening is also in a hexagonal shape. When the motor 122 drives the shaft 3002 to rotate, the hexagonal shaft 3002 in turn carries the blade cylinder 302 to rotate at the same speed.

Still referring to FIG. 4, when the food mixer 102 receives the food ingredients in the receiving chamber 102, the food does not immediately enter the mixing chamber 114 because the blade cylinder 302 largely blocks the entrance to the mixing chamber 114. The food can only enter the mixing chamber 114 through the opening 312 on the blade cylinder 302. This regulates the amount of food in the mixing chamber 114 so that the food can be blended and mixed more thoroughly. When the blade cylinder 302 rotates, the opening 312 and the blade 310 approaches the connecting surface between the receiving chamber 102 and mixing chamber 114. The food travels through the opening 312 and, as the blade 310 is traveling and rotating, is shredded and cut by the blade 310 at the opening 312 into smaller pieces. Inside the blade cylinder 302, the screw bit 300 is also rotating. The screw bit 300 is a screw-shaped component that is used for fine grinding, smoothing, and blending of the food. As the amount of food inside the mixing chamber 114 is limited by the blade cylinder 302, the grinding and smoothing of the food by the screw bit 300 becomes more effective. The ridges on the screw bit 300 slowly move the blended food to the right and eventually expel the blended food at exit spout 116.

Based on the particular embodiment shown in FIG. 4, the blade cylinder 302 can be considered as a shredding component and the screw bit 300 can be considered as a blending component. Those skilled in the art will understand that other types of shredding, crushing, and blending components are possible. For example, the shredding component can be a plurality of blades and the blending component can also be a plurality of blades specially arranged.

FIG. 5 is a side view of a screw bit 300 in accordance with an embodiment of the present invention. The screw bit 300 is the grinding, blending, mixing and smoothing component of the food mixer 100. The screw bit 300 comprises a first set of spiral ridges on its cylindrical surface and a second set of straight ridges on its cone-shaped top. The ridges provide the grinding, smoothing, and blending of the food and also help to expel the food. The bottom of the screw bit 300 is a connection structure for the screw bit 300 to be mounted to the motor. In the particular embodiment shown in FIG. 5, the connection structure is a shaft 3002. However, those skilled in the art would know that other connection structure is also possible. For example, the screw bit 300 may contain a well and the shaft can be an independent component to be inserted into the well. Likewise, the shaft can be part of the motor and a well can be present at the bottom of the screw bit 300 for the shaft to be inserted.

Figure 7:
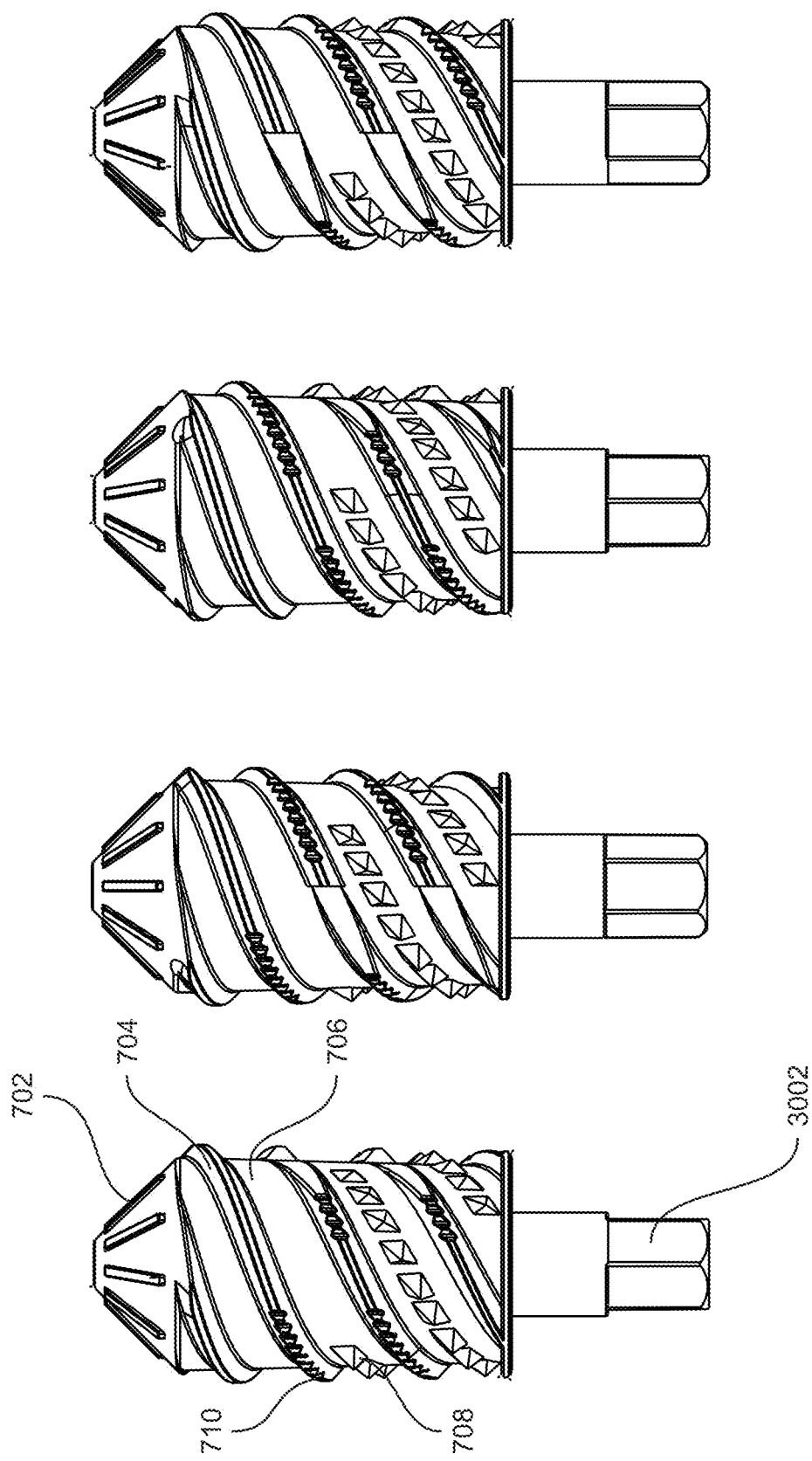
FIG. 7 is different side views of the screw bit shown in FIG. 6 in accordance with an embodiment of the present invention.
Figure 9:
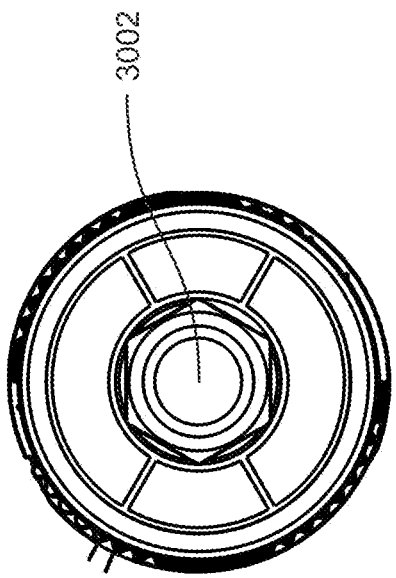
FIG. 9 is a bottom view of the screw bit shown in FIG. 6 in accordance with an embodiment of the present invention.
Figure 8:
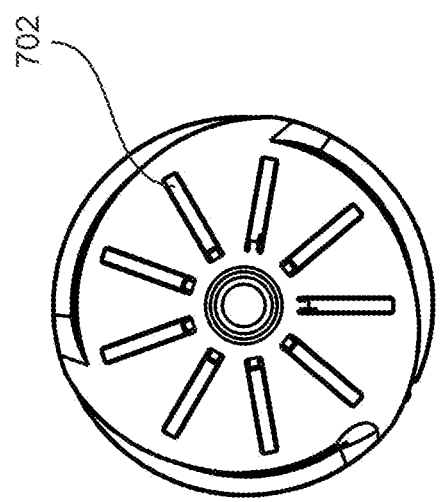
FIG. 8 is a top view of the screw bit shown in FIG. 6 in accordance with an embodiment of the present invention.

FIG. 6 is a perspective view of another version of a screw bit 300 in accordance with some embodiments of the present invention. The screw bit 300 shown in FIG. 6 is an improved version of the screw bit shown in FIG. 5. FIG. 7 shows different side views of the screw bit 300 shown in FIG. 6. FIGS. 8 and 9 show the top and bottom view of the same screw bit 300.

Now referring to FIG. 7, the screw bit 300 in accordance with some embodiments of present inventions comprises a first set of spiral ridges 704 that form a screw pattern and a second set of ridges 702, usually straight, on the cone-shaped top. The spiral ridges 704 form channels 706 between the ridges 704. On the surface of the channels 706 near the bottom of the screw bit 300, a plurality of teeth 708 are present. On the ridges 704 themselves, there are also a plurality of teeth 710. The presence of the teeth 708 and 710 provide better blending, mixing and grinding of the food. Preferably, the teeth 708 are larger than the teeth 710. While particular shapes of the teeth 708 and 710 are shown in FIG. 7, such as the pyramid shape of teeth 708, those skilled in the art will understand than the teeth 708 and 710 can be in any other shapes. When the food first enters the mixing chamber 114, the food requires more grinding and smoothing. The food become smoother as it progress along the screw bit 300. Since the food enters the mixing chamber 114 at a location near the bottom of the screw bit 300, larger teeth 708 are present at the lower portion of the screw bit 300. Likewise, preferably the smaller teeth 710 are located, on average, further along the screw bit 300 than the larger teeth 708 to provide finer grinding, smoothing and blending. The number of teeth decreases towards the top of the screw bit 300. Fewer teeth, or even no tooth, are present at the top portion of the screw bit 300.

Another feature of the improved screw bit 300 shown in FIGS. 6 through 9 is that the width of the channels 706 become increasing wider towards the bottom of the screw bit 300. The distance between the ridges 704 is larger at the bottom of the screw bit 300 than the distance between the ridges 704 at the top of the screw bit 300. This allows better compression of the food and prevents accumulation of food staying in between the screw thread so that the screw bit 300 is easier to be cleaned. It also improves grinding and smoothing of the food and, thus, the texture of the blended food.

The foregoing description of the embodiments of the present invention has been presented for the purpose of illustration and description. It is not intended to be exhaustive or to limit the invention to the precise form disclosed. Many modifications and variations are possible in light of the above teachings. The numerical values described in the description are only for illustration purpose and should not be understood as limiting the invention to the precise numbers. It is intended that the scope of the present invention not be limited by this detailed description, but by the claims and the equivalents to the claims appended hereto.

I claim:

1. A food mixer for processing food, comprising:
   a receiving chamber connected to a mixing chamber at an entrance of the mixing chamber;
   a shredding component rotatably engages with the mixing chamber; the shredding component is a hollow cylinder that has a cylindrical wall and a cavity defined by the cylindrical wall; a linear blade having a length mounted on a surface of the cylindrical wall and a linear first opening along at least a portion of the length of the blade; the cylindrical wall blocks the entrance of the mixing chamber so that the food can only travel through the first opening to the cavity of the shredding component;
   a blending component located inside the cavity of the shredding component and rotatably engages with the shredding component;
   a motor driving the blending component;
   and wherein the blending component comprises a spiral ridge forming a screw pattern, a first tooth on the ridge, and a second tooth on a channel between the ridge.

2. The food mixer of claim 1, wherein the shredding component and the blending component rotate in a different speed.

3. The food mixer of claim 1 further comprises a plunger which removably engages with the receiving chamber.

4. The food mixer of claim 1, the blending component further comprises a shaft.

5. The food mixer of claim 4, wherein the shaft has a non-circular cross section, the shredding component has a second opening complementarily matching the non-circular cross section such that the shaft removably engages the shredding component through the second opening.

6. The food mixer of claim 1, the blending component further comprises a cone-shaped top and a second ridge on the cone-shaped top.

7. The food mixer of claim 1, wherein the channel between the ridge of the blending component becomes increasing wider toward one end of the blending component.

* * * * *